United States Patent
Sinding et al.

(10) Patent No.: US 12,209,709 B2
(45) Date of Patent: Jan. 28, 2025

(54) HYDROGEN REFUELING STATION AND METHOD FOR REFUELING A HYDROGEN VEHICLE

(71) Applicant: Nel Hydrogen A/S, Herning (DK)

(72) Inventors: Claus Due Sinding, Silkeborg (DK); Thomas Christian Francois Charbonneau, Toulouse (FR)

(73) Assignee: NEL HYDROGEN A/S, Herning (DK)

( * ) Notice: Subject to any disclaimer, the term of this patent is extended or adjusted under 35 U.S.C. 154(b) by 282 days.

(21) Appl. No.: 17/771,610

(22) PCT Filed: Oct. 30, 2020

(86) PCT No.: PCT/DK2020/050297
§ 371 (c)(1),
(2) Date: Apr. 25, 2022

(87) PCT Pub. No.: WO2021/083471
PCT Pub. Date: May 6, 2021

(65) Prior Publication Data
US 2022/0364680 A1 Nov. 17, 2022

(30) Foreign Application Priority Data
Oct. 30, 2019 (DK) .......................... PA 2019 70671

(51) Int. Cl.
*F17C 5/06* (2006.01)
(52) U.S. Cl.
CPC .......... *F17C 5/06* (2013.01); *F17C 2201/056* (2013.01); *F17C 2205/0142* (2013.01);
(Continued)
(58) Field of Classification Search
CPC .................. F71C 5/06; F71C 2201/056; F71C 2205/0142; F71C 2205/0326;
(Continued)

(56) References Cited

U.S. PATENT DOCUMENTS 7,128,103 B2 * 10/2006 Mitlitsky .......... H01M 8/04089
141/82
9,845,917 B2 * 12/2017 Allidieres ............... F17C 5/007
(Continued)

FOREIGN PATENT DOCUMENTS

| EP | 2703709 A1 | 3/2014 |
| JP | 2018151043 A | 9/2018 |

OTHER PUBLICATIONS

International Search Report for corresponding application PCT/DK2020/050297 filed Oct. 30, 2020; Mail date Feb. 1, 2021.
(Continued)

*Primary Examiner* — Nicolas A Arnett
(74) *Attorney, Agent, or Firm* — CANTOR COLBURN LLP (57) ABSTRACT

A hydrogen refueling station including a first and a second dispensing module having first and second dispensing pressure detection means, where supply lines are fluidly connecting a storage module to an inlet compressor line and a compressor outlet line is fluidly connecting an outlet of the compressor to a dispensing line and thereby to the first and/or second dispensing module via output compressor valves, cascade lines are fluidly connecting the hydrogen storage module and the dispenser modules thereby configured for bypassing the compressor, where a controller is configured for controlling valves and thereby a fluid path from the hydrogen storage module to the dispensing modules, the controller is configured for controlling a bypass valve based on feedback from pressure detection means, from a first dispensing pressure detection means or from a second dispensing pressure detection means to establish a required pressure in the compressor outlet line.

27 Claims, 5 Drawing Sheets

(52) U.S. Cl.
CPC ............... *F17C 2205/0326* (2013.01); *F17C 2205/0335* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0157* (2013.01); *F17C 2227/0337* (2013.01); *F17C 2227/039* (2013.01); *F17C 2227/043* (2013.01); *F17C 2250/032* (2013.01); *F17C 2250/043* (2013.01); *F17C 2250/0626* (2013.01); *F17C 2250/0636* (2013.01); *F17C 2260/021* (2013.01); *F17C 2260/025* (2013.01); *F17C 2265/065* (2013.01); *F17C 2270/0139* (2013.01); *F17C 2270/0168* (2013.01)

(58) Field of Classification Search
CPC ........ F71C 2205/0335; F71C 2221/012; F71C 2223/0123; F71C 2223/036; F71C 2225/0123; F71C 2225/036; F71C 2227/0157; F71C 2227/0337; F71C 2227/039; F71C 2227/043; F71C 2250/032; F71C 2250/043; F71C 2250/0626; F71C 2250/0636; F71C 2260/021; F71C 2260/025; F71C 2265/065; F71C 2270/0139; F71C 2270/0168

See application file for complete search history.

(56) References Cited

U.S. PATENT DOCUMENTS

| | | | | |
|---|---|---|---|---|
| 10,082,247 | B1* | 9/2018 | Sinding | F17C 13/025 |
| 10,288,222 | B2* | 5/2019 | Sinding | F17C 5/06 |
| 10,466,722 | B2* | 11/2019 | Mortensen | F17C 5/06 |
| 10,495,257 | B2* | 12/2019 | Mathison | F17C 5/007 |
| 11,187,382 | B2* | 11/2021 | Thieu | F17C 5/06 |
| 11,255,484 | B2* | 2/2022 | Thibaut | F17C 13/025 |
| 11,913,606 | B2* | 2/2024 | Bødker | F17C 5/06 |
| 2003/0164202 | A1* | 9/2003 | Graham | B60S 5/02 |
| | | | | 141/98 |
| 2005/0000802 | A1* | 1/2005 | Hobbs | F17C 9/04 |
| | | | | 205/637 |
| 2009/0151812 | A1* | 6/2009 | Allidieres | F17C 5/007 |
| | | | | 141/82 |
| 2014/0036858 | A1* | 2/2014 | Shimezawa | H04W 72/23 |
| | | | | 370/329 |
| 2014/0196814 | A1* | 7/2014 | Nagura | F17C 13/026 |
| | | | | 141/82 |
| 2015/0153005 | A1* | 6/2015 | Takano | F17C 5/007 |
| | | | | 141/227 |
| 2016/0116113 | A1* | 4/2016 | Mrowzinski | F17C 5/007 |
| | | | | 222/3 |
| 2016/0319810 | A1* | 11/2016 | Gibbs | F04B 41/06 |
| 2017/0067600 | A1* | 3/2017 | Poorman | F17C 5/06 |
| 2017/0130901 | A1* | 5/2017 | Sloan | F17C 5/06 |
| 2019/0041003 | A1* | 2/2019 | Hashimoto | B01J 4/001 |
| 2022/0161183 | A1* | 5/2022 | Maehara | F17C 5/06 |

OTHER PUBLICATIONS

Written Opinion for corresponding application PCT/DK2020/050297 filed Oct. 30, 2020; Mail date Feb. 1, 2021.

* cited by examiner

HYDROGEN REFUELING STATION AND METHOD FOR REFUELING A HYDROGEN VEHICLE

TECHNICAL FIELD

The disclosure relates to a hydrogen refueling station and a method for refueling a hydrogen vehicle.

BACKGROUND

Hydrogen refueling stations are used for filling hydrogen vehicles with hydrogen fuel by leading hydrogen from hydrogen storage tanks to dispensers arranged to couple with the hydrogen vehicle so that the hydrogen tank in the vehicle may be refueled.

Usually, the refueling may be performed by filling the vehicle directly from the hydrogen storage tank (cascade refueling) or by leading the hydrogen through a compressor for compressing the hydrogen to a certain pressure (direct fill).

Known hydrogen stations are arranged so that hydrogen flows from a storage tank containing the hydrogen, pressurized in a compressor and fed into the hydrogen vehicle. However, the arrangement of prior art hydrogen stations is such that the power consumption is large and/or the refueling time may be relatively long.

Hence the present disclosure seeks to solve the above-mentioned problems.

BRIEF SUMMARY

The disclosure relates to a hydrogen refueling station) comprising: a hydrogen storage module comprising at least a first hydrogen storage tank, a hydrogen station module comprising a compressor and a controller, a first dispensing module comprising a first dispensing nozzle connectable to a first vehicle and a first dispensing pressure detection means, and a second dispensing module comprising a second dispensing nozzle connectable to a second vehicle and a second dispensing pressure detection means. Wherein a first supply line is fluidly connecting the hydrogen storage module to an inlet compressor line on a low-pressure side of the compressor via a first inlet compressor valve. Wherein a compressor outlet line is fluidly connecting an outlet on a high-pressure side of the compressor to a dispensing line and thereby to the first dispensing module via a first output compressor valve and to a further dispensing line and thereby to the second dispensing module via a second output compressor valve. Wherein a first cascade line is fluidly connecting the hydrogen storage module and the first dispenser module via a first cascade valve and thereby the first cascade line is configured for bypassing the compressor. Wherein a second cascade line is fluidly connecting the hydrogen storage module and the second dispenser module via a third cascade valve and thereby the second cascade line is configured for bypassing the compressor. Wherein the controller is configured for controlling valves and thereby a fluid path from the hydrogen storage module to the first dispensing module and to the second dispensing module. Wherein a pressure detection means is configured for detecting a pressure in the compressor outlet line. Wherein a backflow line is connecting the compressor outlet line to the first supply line via a bypass valve. Wherein the controller is configured for controlling the bypass valve based on feedback from the pressure detection means, from the first dispensing pressure detection means or from the second dispensing pressure detection means to establish a required pressure in the compressor outlet line.

This is advantageous in that the required pressure can be chosen high enough to be able to immediately start the refueling of a second vehicle connected to the further dispensing module, even if this vehicle has a higher pressure in its tank than the vehicle that is being refueling via the (first) dispensing module. Further, an advantage is that such simultaneous refueling of two vehicles with different pressure in tanks is possible without a high-pressure storage in the storage module.

Further, it is advantageous in that it in the situation where the flow is terminated to a vehicle being refueled the bypass valve can be used to allow hydrogen gas to escape the compressor outlet line e.g. back to one of the vessels of the storage module. This is advantageous in that then the compressor does not need to be stopped e.g. during the few seconds an intermediate leakage check is made.

A hydrogen refueling station as described above is advantageous in relation to the state of the art in that the backflow line allows for bypassing of the compressor when the pressure in upstream side of the first output compressor valve reaches a threshold value. This is advantageous because it allows for the compressor to operate at a constant operating speed instead of throttling the compressor (or turning it on/off) when the pressure detection means detect a pressure above a threshold value which is usually reached relatively quickly when hydrogen flow through the dispenser is ceased. Furthermore, the backflow line allows for venting of the compressor outlet line if the threshold pressure is detected so that fluid lines, compressor, valves and other components are protected from overload due to an overpressure. Also, the hydrogen flow from the compressor outlet line may be fed back into the storage tanks for pressure consolidation so that the pressurized hydrogen is utilized for refilling the storage tanks. Controlling whether the excess pressurized hydrogen should flow back into the compressor via the compressor inlet line or if it should be fed back into the storage tanks may be performed by controlling the open/closed status of the first compressor inlet valve, the second compressor inlet valve, the low-pressure storage valve and the medium-pressure storage valve.

Furthermore, maintaining the compressor operating speed substantially constant and at least not turning it off (even when the threshold pressure is detected) is advantageous in that the pressure at the compressor outlet line may at all times be maintained at highest allowable pressure, i.e. near the threshold value so that building up of pressure is not necessary (as would be the case if the compressor where to throttle up and down repeatedly) when a hydrogen vehicle must be refueled after a flow stop, venting or other. Hereby, the refueling may be performed faster because time is not spent on building up pressure in the pressure outlet line. Further, the need for high pressure storage tank(s) (up to 1000 bar) is eliminated i.e. a significant cost reduction of the overall station design is achieved.

Also, this is advantageous in that the lifetime of the compressor, and the overall system, is increased as the stress on the compressor and other system components is reduced e.g. due to operation of the compressor at a within a preferred speed range or at least without stopping it. Such a speed range is preferably between 200 and 1,000 rpm (revolutions per minute), most preferably between 600 and 800 rpm.

It should be noted that the term "low-pressure storage tank" should be understood as a vessel, container, reservoir or similar which is capable of storing a fluid at a pressure range of between 100 and 400 bar.

It should be noted that the term "medium-pressure storage tank" should be understood as a vessel, container, reservoir or similar which is capable of storing a fluid at a pressure range of between 400 and 800 bar.

It should also be noted that the number of low-pressure hydrogen storage tanks and/or medium-pressure storage tanks could be one, two, five, ten or any number larger or in between.

In this context the term "pressure detection means" should be understood as a manometer, pressure transducer, a spring biased mechanism or any other type of pressure detector which may measure a pressure in a fluid line. Thus, e.g. a spring biased mechanism may also be understood as a pressure detection means in that it the spring is chosen so that it is compressed or elongated according to pressure. The pressure is typically the gauge pressure (i.e. the pressure in relation to the ambient) but could also be absolute pressure (pressure in relation to an absolute vacuum) or other terminology to describe the pressurized fluid in the fluid lines of the system.

The fluid line could be a pipe, tube, channel or other type of fluid conductor which may lead a pressurized fluid from one point to another. Typically, the compressor output line and dispenser line have an inner diameter of between 4.5 mm and 9 mm, typically between 5.3 mm and 7.9 mm.

A compressor in such a system could be a reciprocating type compressor. However, it could also be rotary compressor, centrifugal compressor or axial compressor.

It should be emphasized that in this context, the term "controller" should be understood as a microcontroller, computer, PLC controller, electro-mechanical controller, spring-biased mechanism or any other type of controlling unit which may be used to control a plurality of valves according to external inputs such as pressure and temperature.

In this context, the term "bypass valve" should be understood as a pressure relief valve, a gate valve, a ball valve, a quarter turn valve, a backpressure valve, a spring-biased valve, an electromagnetic valve, a dome-loaded valve, an equilibar pressure regulator or any other type of valve which may be actuated when a certain pressure is detected so that a "path of least resistance" (a bypass line) is achieved through the valve wherein fluid may be conducted through.

The dispensing nozzle could be any type of nozzle which is arranged to couple a dispensing module and the inlet to a storage tank of a hydrogen vehicle so that hydrogen refueling may be performed.

According to an embodiment of the disclosure, hydrogen storage module further comprises at least one second hydrogen storage tank.

The second hydrogen storage tank comprising hydrogen gas having a pressure that is higher than the hydrogen gas comprised by the first hydrogen storage tank. Therefore, the first hydrogen storage tank may be referred to as low-pressure tank and the second hydrogen storage tank may be referred to as medium-pressure storage tank.

This is advantageous in that it is possible to perform cascade refueling from a storage tank with a larger pressure than the low-pressure storage tank so that the need for pressurization by use of the compressor is reduced.

According to an exemplary embodiment, a second supply line is fluidly connecting the at least one second hydrogen storage tank to the inlet compressor line via a second inlet compressor valve, and the second supply line together with the first cascade line are fluidly connecting the at least one second storage tank to the dispensing line and thereby to the dispenser module via a second cascade valve, and the second supply line together with the second cascade line are fluidly connecting the at least one second storage tank to the further dispensing line and thereby to the further dispenser module via a fourth cascade valve.

The hydrogen refueling station may comprise at least one further dispensing module fluidly connected to the compressor outlet line via a second output compressor valve. This is advantageous in that it is thereby possible to simultaneously perform cascade refueling and direct fill, which is advantageous in that two different hydrogen vehicles (also with two different pressure in the vehicle tanks), with different tank pressures, may be refueled at the same time. One vehicle, requiring lower pressure, could be refueled by cascade refueling and another vehicle, requiring high(er) pressure, by direct fill. Also, it is possible to cascade refuel or direct fill through one of the dispensers while the second dispenser is not used (e.g. during service).

The term "direct refueling" should be understood such that the refueling is achieved by conducting the hydrogen flow through the compressor so that the hydrogen pressure is increased.

The bypass valve is communicatively coupled to the controller so that the bypass valve is controlled by the controller. This is advantageous in that it enables the bypass valve to join a network of other valves, compressors, storage tanks so that the control of the entire refueling station is optimized and allowing the threshold pressure to be maintained at the compressor output line independent of compressor speed and of "consumption" of hydrogen gas from the compressor output line.

The dispensing line connects the hydrogen station module and the dispensing modules. This is advantageous in that the flow of hydrogen may flow from the hydrogen station module to the dispensing module located physically separated from the station module with up to 50 or 60 meters.

According to an embodiment of the disclosure, at least a portion of the dispensing line and/or the further dispensing line is disposed under the supporting ground.

The hydrogen station module and the dispensing module are usually positioned at a distance between each other, e.g. due to safety or footprint so that the pressurized tanks are not near the dispensing module where refueling of the hydrogen vehicles is taking place. Thus, it is advantageous to provide at least a portion of the dispensing line under the supporting ground i.e. under ground level in that the dispensing line is better stored so that it is not damaged from passing vehicles, operators or weather (especially direct sunlight that would heat up the pipe) and the passing vehicles and operators are not themselves injured/damaged by accidently impacting the dispensing line.

According to an embodiment of the disclosure, the controller is configured to control the status of at least one of the first inlet compressor valve, a first dispensing valve, first output compressor valve and first cascade valve based on the pressure in the first storage tank and/or pressure in a vehicle tank connected to the dispensing module.

This is advantageous in that the controller may control the flow path so that hydrogen is flowing through the cascade line or through the compressor depending on the pressure in the low-pressure storage tank and/or the vehicle tank. For example, if the pressure in the low-pressure storage tank is low, the controller may direct the flow of hydrogen through the compressor so that the hydrogen pressure is increased. Or, if the hydrogen vehicle tank pressure is sufficiently low compared to the pressure in the low-pressure storage tank, direct the hydrogen fluid directly to the hydrogen vehicle by leading the flow of hydrogen through the cascade line. Thus, the refueling process may become more efficient.

According to an embodiment of the disclosure, the controller further is configured to control the status of at least one of the second inlet compressor valve, first output compressor valve, a first dispensing valve and second cascade valve based on the pressure in the second storage tank and/or pressure in a vehicle tank connected to the dispensing module.

This is advantageous in that the controller may control the flow path so that hydrogen is flowing through the cascade line or through the compressor depending on the pressure in the medium-pressure storage tank and/or the vehicle tank. For example, if the pressure in the medium-pressure storage tank is low, the controller may direct the flow of hydrogen through the compressor so that the hydrogen pressure is increased. Or, if the hydrogen vehicle tank pressure is sufficiently low compared to the pressure in the low-pressure storage tank, direct the hydrogen fluid directly to the hydrogen vehicle by leading the flow of hydrogen through the cascade line. Thus, the refueling process may become more efficient.

According to an exemplary embodiment, the controller is configured to control the status of at least one of the first inlet compressor valve, second output compressor valve, a second dispensing valve and third cascade valve based on the pressure in the first storage tank and/or pressure in a vehicle tank connected to the further dispensing module According to an exemplary embodiment, the controller further controls the status of at least one of the second inlet compressor valve, second output compressor valve, a second dispensing valve and fourth cascade valve based on the pressure in the second storage tank and/or pressure in a vehicle tank connected to the further dispensing module.

According to an embodiment of the disclosure, the hydrogen refueling station comprises at least one further hydrogen station module. This is advantageous in that the capacity of the hydrogen refueling station is increased whereby more hydrogen vehicles may be refueled simultaneously. It should be noted that the number of further hydrogen station modules could be at least one, two, five, ten or more.

According to an embodiment of the disclosure, the pressure detection means is arranged in the compressor outlet line.

Fluid pressure drops as it flows along pipes, tubes. Thus, it is advantageous to provide the pressure detection means in the compressor outlet line in that the pressure in this compressor outlet line may be assumed to represent the pressure directly at the outlet of the compressor so that any threshold pressure is not exceeded. Further, the volume of the compressor output line i.e. the pipe volume between the output of the compressor and compressor output valves and bypass valve are so small that the threshold pressure is reached very fast i.e. within seconds when the compressor is in operation. Therefore, in this volume it is preferred to measure pressure based on which the bypass valve is controlled. In addition to what is mentioned above, a venting valve may also be connected to this volume. Such venting valve is a mechanical valve that may open when the pressure prevailing in there reaches a certain value, the value being below a safety value for the piping system of the compressor output line.

According to an embodiment of the disclosure, the bypass valve is configured to open if the pressure in the compressor outlet line is above a threshold pressure is selected in the range of 400 and 1200 bar.

If the threshold pressure is too low, the compressor may not pressurize the hydrogen to a sufficiently large pressure to refuel a hydrogen vehicle and if the threshold pressure is too large, the pressure may become too large and hazardous situations may occur. Thus, the above-mentioned pressure range reflects an advantageous relationship between functionality, efficiency and safety. It should be noted that exemplary threshold pressures could be 500 bar, 950 bar, 1000 bar or 1050 bar or any other value in the above-mentioned range.

According to an embodiment of the disclosure, the bypass valve is a backpressure valve.

It is advantageous if the bypass valve is a backpressure valve, which may also be referred to as a backpressure regulator, in that such a valve may adjust the pressure by opening just as much as is needed to vent the excess pressure so as to reduce the pressure and thereby ensure that the pressure in the output compressor line is below the threshold pressure. Such a backpressure valve could be any type of valve comprising an adjustable control element, so that the excess pressure is vented when the pressure against the control element exceeds the spring load. Such adjustable control elements could be a spring or compressed air, so that when the pressure acting on the backpressure valve is below a threshold pressure, the control element (e.g. a piston) is held in a closed position due to the spring force or pressure in the compressed air. And if the pressure acting on the backpressure valve exceeds a threshold pressure represented by the spring load or compressed air; the control element is forced to an open position so that the excess pressure is vented and the pressure in the fluid line thereby reduced. By such mechanical mechanism the threshold pressure can be manually adjusted.

According to an embodiment of the disclosure, the pressure detection means is arranged in the bypass valve. This is advantageous in that the pressure detection means and bypass valve may be arranged in a single unit where the pressure detection means is adapted to activate the bypass valve at given pressure limit.

According to an embodiment of the disclosure, the hydrogen is in gas form.

It is advantageous if the hydrogen is in gas form in that the hydrogen vehicle requires the hydrogen to be in gas form and therefore, if the hydrogen is in gas form, the hydrogen may be filled directly in the vehicle. Furthermore, it is advantageous if the hydrogen is in gas form in that it is easier to pressurize and transport in large amounts through fluid lines.

According to an embodiment of the disclosure, the hydrogen storage module is mobile. Thus, the hydrogen storage module could be a mobile motorized vehicle comprising the storage tanks, which is advantageous in that the refueling system is more flexible. Furthermore, it is advantageous if the hydrogen storage module is mobile in that storage module may be transported to a new position, e.g. by first disconnecting the storage module from a valve panel of the remaining refueling station and transport it. Alternatively, the hydrogen storage module could be transported away (e.g. for service or refueled) and replaced by another mobile hydrogen storage module.

According to an embodiment of the disclosure, the low-pressure storage tank and/or the medium-pressure storage tank is mobile. This is advantageous in that the storage tanks may be transported by a motorized vehicle so that the storage tanks may be transported to different refueling stations and hydrogen production facilities. Mobile storage includes storage on a truck trailer.

According to an exemplary embodiment, the required pressure is higher than the pressure measured by the first and second dispensing pressure detection means and/or is higher than the target pressure of the first and second vehicle. This is advantageous in that it has the effect, that a pressure in the compressor outlet line is higher than the pressure in the tank of the vehicle and thereby flow of hydrogen gas from the hydrogen refueling station towards and into the vehicle tank is established.

According to an exemplary embodiment, the controller is configured to control the valves so as to facilitate simultaneous refueling tanks of two vehicles comprising hydrogen gas of different pressures. This is advantageous in that it has the effect, that by using only a first low-pressure storage and the compressor, it may be possible to refuel two vehicles simultaneously without the use of a high-pressure storage. A high-pressure storage is typically having a pressure above 750 bar (whereas the low-pressure storage typically is between 150 and 300 bar and the medium pressure storage typically is between 400 and 600 bar). Avoiding the high-pressure storage reduces costs and energy to establish the high pressure. In embodiments, if the capacity of the compressor is sufficient, the medium-pressure storage can also be avoided with the substantially the same benefits.

According to an exemplary embodiment, the first dispensing valve and the second dispensing valve is located upstream in the flow lines from the hydrogen storage module to the dispensing modules of a cooling system of the hydrogen station module. This is advantageous in that it has the effect, that heat generated from regulating flow of hydrogen gas heating the hydrogen gas is removed by the cooling system prior to being introduced into a vehicle tank.

Moreover, the disclosure relates to a method for refueling a hydrogen vehicle, the method comprising the steps of: allowing flow of hydrogen gas from a first hydrogen storage tank to a vehicle tank connected to a dispensing module via a first supply line, a first cascade line and a first dispensing line. Terminating the flow of hydrogen gas from the first hydrogen storage tank. Allowing flow of hydrogen gas from a second hydrogen storage tank to the vehicle tank via a second supply line, the first cascade line and the first dispensing line. Terminating the flow of hydrogen gas from the second hydrogen storage tank. Establishing a flow of hydrogen gas from the first storage tank or the second storage tank via a compressor to the vehicle tank via the first supply line or second supply line, compressor inlet line, compressor outlet line and the first dispensing line. Monitoring the pressure in the compressor outlet line with a pressure detection means and controlling by a controller a bypass valve based on feedback from the pressure detection means to establish a required pressure in the compressor outlet line.

This is advantageous in that it has the effect, that if e.g. due to leakage checks the flow terminates to the dispensing module, the pressure in the outlet line can be maintained at a required level until flow is re-established. The flow may either be cycled in the bypass line or use to consolidate gas in storages of the hydrogen storage module. This is advantageous sin that in this way the compressor does not need to stop but can continue operation.

It is advantageous to use a method as described above for refueling a hydrogen vehicle in that the compressor and the cascade refueling is utilized better. Furthermore, using the above method is advantageous in that any pressure build-up in the compressor outlet line can be used as start pressure for the direct fill part of a refueling and thereby the need for a high-pressure storage no longer exists leading to cost reduction, less complex station design and faster refueling (in that pressure does not have to build up). Any pressure built up in the compressor output line can be vented by the backflow line so that the compressor, and other system components, are protected from over pressurization and thereby potential failure/hazardous situations. Furthermore, maintaining a predetermined pressure in the compressor outlet line is advantageous in that a high-pressure storage tanks are not necessary since the compressor outlet line provides for high-pressure immediately when requested without time delay caused by pressure build up since the pressure in this line is always maintained at, or close to, the threshold pressure.

Furthermore, it is advantageous to establish or maintain the pressure in the compressor output line during cascade refueling of a vehicle tank. This is because when the refueling method change to direct fill, the pressure in the output line is at the predetermine and desired starting pressure. In addition, in case the one compressor output line is fluidly connectable to two dispenser modules, the pressure in the output line may be maintained or established even though direct fill is used for filling the vehicle tank. The bypass valve may serve as an extra safety valve ensuring a maximum pressure in the compressor output line by opening and leading gas back to the storage when pressure is above the threshold value.

The volume of the compressor output line is defined by the pipes between the output of the compressor and the compressor output valves and bypass valve i.e. the volume is small. When the compressor is running, and the output valve(s) are closed the pressure in the compressor output line increases fast up to the point where the bypass valve opens. In this way, a pressure similar to the threshold pressure is maintained in the output line which is advantageous in that a direct fill of a vehicle tank can start from this pressure after the vehicle tank is partly filled by the cascade method.

The threshold pressure is comparable to a pressure of a so-called high-pressure storage which therefore can be avoided leading to cost and footprint reduction as well as a simpler design of the refueling station.

Furthermore, when the threshold pressure is reached in the volume between the output of the compressor and the compressor output valves and bypass valve, it may be possible to keep the compressor running so that pressure consolidation may be performed by opening the bypass valve and leading the hydrogen back to the low-pressure and/or medium-pressure storage tanks so that these may be pressurized (if the pressure in them is low e.g. after cascade filling).

According to an exemplary embodiment, the method further comprising the step of while continuing refueling the vehicle connected to the dispensing module, connecting a vehicle to a further dispensing module, establish flow of hydrogen gas from the hydrogen storage module to the further dispensing module, and simultaneously refueling a vehicle from both dispensing modules.

This is advantageous sin that during refueling of the vehicle establishing a pressure in the compressor outlet line at a certain threshold level ensures, that a second vehicle can be connected to a second dispensing module and refueled simultaneously with the first vehicle without having a high-pressure storage.

According to an exemplary embodiment, the flow from the hydrogen storage module to the dispensing module and/or to the further dispensing module is controlled by the controller controlling one or more of a first storage valve, a second storage valve, a first inlet compressor valve, a second inlet compressor valve, a first output compressor valve, a second output compressor valve, a first cascade valve, a second cascade valve, a third cascade valve, a fourth cascade valve, a bypass valve, a first dispensing valve and a second dispensing valve.

According to an embodiment of the disclosure, hydrogen gas flow may be redirected via the back flow line to the first hydrogen storage tank or the second hydrogen storage tank via the first supply line or the second supply line. By redirecting should be understood guiding flow of hydrogen gas from the outlet of the compressor to the inlet of the compressor or to the storage module.

This is advantageous in that the excess pressure which is redirected from the high-pressure side of the compressor is stored in the storage tanks instead of, potentially, being vented and lost in the atmosphere. Thus, the efficiency of the refueling station is increased in that this pressure consolidation of low/medium pressure storages is part of an inevitable preparation of pressure in these storages that is used for the cascade part of future refueling. Ultimately, if pressure maximum is reached in the storages and no vehicles are refueled, the compressor speed can be reduced or even stopped.

According to an embodiment of the disclosure, the redirected hydrogen flow is recirculated back into the compressor.

This is advantageous in that the compressor may run in a steady operating speed instead of fluctuating operating speed whereby the compressor is less fatigued. Furthermore, redirecting the hydrogen flow so that it is recirculated back into the compressor is advantageous in that the hydrogen remains in the system so that it is not lost and whereby the overall efficiency of the system is increased.

The hydrogen is preferably in gas form. This is advantageous in that it is easier to transport the hydrogen in the fluid lines of the refueling station. Furthermore, most hydrogen vehicles require that the hydrogen is in gas form and therefore it is advantageous if the hydrogen is in such a state in that the refueling station is adapted to refuel hydrogen vehicles without the use of complex modules for changing the state of hydrogen from liquid to gas.

According to an embodiment of the disclosure, the flow of hydrogen gas to one of the dispensing modules is terminated and redirected via the backflow line to the hydrogen storage module. In the same way, the flow of hydrogen from the low-pressure storage tank and/or medium-pressure storage tank is terminated.

It is advantageous to terminate the flow of hydrogen in that leak checks, service, repair or other may be performed on the hydrogen refueling station. It should be emphasized that although flow of hydrogen to a dispensing module may be terminated, the compressor may still operate so that a pressure in the compressor outlet line is maintained at a constant value at, or close to, the threshold pressure by controlling the bypass valve.

It should be noted that the flow of hydrogen may be terminated entirely (i.e. no flow of hydrogen from the storage tanks) or it may be terminated locally, e.g. flow of hydrogen is allowed from one of the storage tanks (e.g. low-pressure) while it is terminated from the other storage tank.

The controller may control the status of the first inlet compressor valve, first cascade valve and first dispensing valve. This is advantageous in that the controller may control if the hydrogen from the storage tanks should flow through the cascade line or the compressor.

In an exemplary embodiment according to the disclosure, the dispensing valve may be configured for regulating flow of hydrogen to the dispensing nozzle, based on the pressure measured with a pressure detection means positioned downstream to the dispensing valve. This may be advantageous in that when refueling a hydrogen tank, the dispensing valve may open gradually to allow hydrogen to flow through the dispensing nozzle, thereby ensuring that pressure downstream to the dispensing valve is increases gradually to avoid overheating.

According to an embodiment of the disclosure, the controller controls the valves based on input from the vehicle tank, the pressure in the first hydrogen storage tank, the pressure in the second hydrogen storage tank, pressure reading from first dispensing pressure detection means and/or second dispensing pressure detection means.

This is advantageous in that the hydrogen flow path may be optimized according to the current pressure levels in the storage tanks or the pressure in the hydrogen vehicle tank so that the use of the compressor is optimized. For example, if the storage pressure is lower than in the vehicle tank compared to the pressure in the medium-pressure storage tank, the controller may control the valves so that the hydrogen flows through the compressor and is thereby (further) pressurized. Or if the pressure in the low-pressure storage tank is low in comparison with the vehicle tank pressure and the pressure in the medium-pressure storage tank is sufficient to refuel the vehicle, the controller may direct hydrogen flow from the medium-pressure storage tank to the vehicle.

The dispensing module comprises at least two dispensing nozzles. This is advantageous in that at least two hydrogen vehicles may be refueled, which is advantageous for the customer in that the refueling process is faster.

The present disclosure solves the above problem by a hydrogen refueling station comprising a hydrogen storage module comprising at least one low-pressure hydrogen storage tank, a hydrogen station module comprising a compressor and a controller, and a dispensing module comprising a dispensing nozzle. A low-pressure supply line is fluidly connecting the at least one low-pressure hydrogen storage tank to an inlet compressor line on a low-pressure side of the compressor via a first inlet compressor valve. A compressor outlet line is fluidly connecting an outlet on a high-pressure side of the compressor to a dispensing line and thereby to the dispensing module via a first output compressor valve. A cascade line is fluidly connecting the at least one low-pressure hydrogen storage tank to the dispenser module via a first cascade valve and thereby the cascade line is configured for bypassing the compressor. The controller is configured for controlling the valves and thereby the fluid path from the hydrogen storage module to the dispensing module. A pressure detection means is configured for detecting a pressure upstream the first output compressor valve. A backflow line is connecting the compressor outlet line to the low-pressure supply line and medium-pressure supply line via a bypass valve, and the bypass valve is configured to be controlled based on feedback from the pressure detection means to establish and maintain a predetermined pressure in the compressor outlet line.

Furthermore, the disclosure relates to a method for refueling a hydrogen vehicle, the method comprising the steps of:
  allowing flow of hydrogen from a low-pressure hydrogen storage tank to a vehicle tank via a low-pressure supply line, a cascade line and a dispensing line by controlling a low-pressure storage valve, first inlet compressor valve, a first cascade valve and a first dispensing valve, terminating the flow of hydrogen from the low-pressure hydrogen storage tank, allowing flow of hydrogen from a medium-pressure hydrogen storage tank to a vehicle tank via a medium-pressure supply line, a cascade line and a dispensing line by controlling a medium-pressure storage valve, second inlet compressor valve, a second cascade valve and a second dispensing valve, terminating the flow of hydrogen from the medium-pressure hydrogen storage tank, establishing a flow of hydrogen from the low-pressure storage tank or the medium-pressure storage tank via a compressor to the vehicle tank via the low-pressure supply line or medium-pressure supply line, compressor inlet line, compressor outlet line and the dispensing line, monitoring the pressure in a compressor outlet line with a pressure detection means, controlling a bypass valve based on feedback from the pressure detection means to establish and maintain a predetermined pressure in the compressor outlet line.

BRIEF DESCRIPTION OF THE DRAWINGS

For a more complete understanding of the disclosure, reference is now made to the following brief description of various combinable embodiments of the disclosure, taken in connection with the accompanying drawings and detailed description, wherein like reference numerals represent like parts.

DETAILED DESCRIPTION

Figure 1:
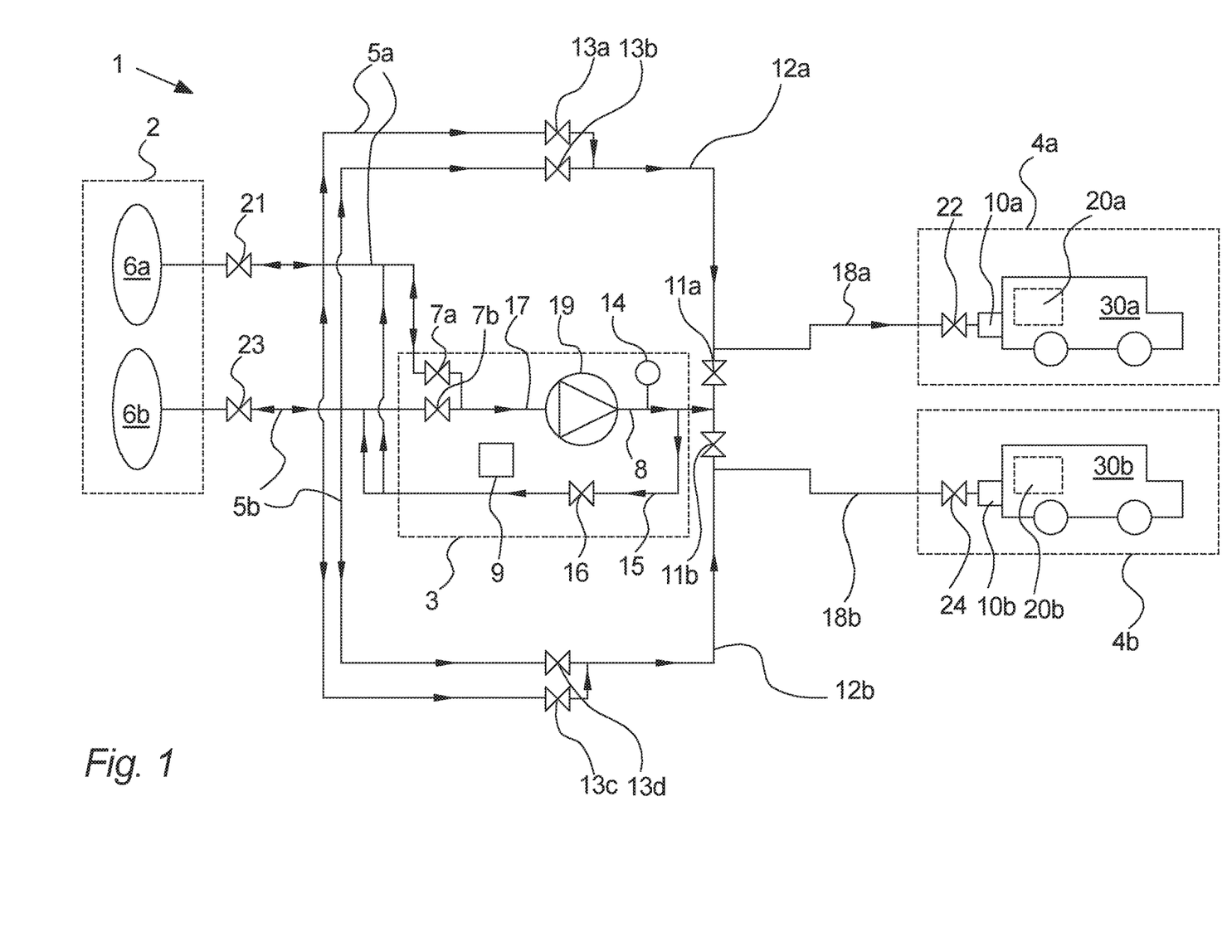
FIG. 1 illustrates the concept of the hydrogen refueling station according to the disclosure.

FIG. 1 discloses the concept of the hydrogen refueling station 1 according to an embodiment of the disclosure. Hydrogen from the low-pressure storage tank 6a (also in this document referred to as first hydrogen storage tank) may flow through the open low-pressure storage valve 21 (also in this document referred to as first storage valve) and via the low-pressure supply line 5a (also in this document referred to as first supply line) to either the compressor 19 or the first cascade line 12a. This is controlled by the open/close status of the first cascade valve 13a and the first inlet compressor valve 7a. If the first cascade valve 13a is closed and the first inlet compressor valve 7a is open, the hydrogen is allowed to flow through the compressor inlet line 17 and into the compressor 19 where the hydrogen may be pressurized to a higher pressure.

Note, that based on the configuration of valves on the figures, the skilled person would be able to control status of the valves to allow desired flow in one or more flow paths from storage 2 to dispensers(s) 4a, (4b) also simultaneous flow to two dispensers 4a, 4b of hydrogen gas having different pressures. Accordingly, even though not described other configurations of valves and flow paths would be possible to establish by the skilled person via programming the controller 9. The controller may be a standard industrial PLC (PLC; Programmable Logic Controller) and thus connected to and configured to control all of the valves, detection means which typically would be implemented as sensors, cooling system, compressor, safety etc. for the hydrogen refueling station to operate in a safe manner.

If the pressure on the high-pressure side of the compressor 19, i.e. the compressor output line 8, is below the threshold pressure as measured by the pressure detection means 14, the bypass valve 16 stays in a closed position. The threshold pressure may alternatively be determined by or equal to pressure in any of a vehicle tank to be refueled or storage tank 6a, 6b to be consolidated.

If a hydrogen vehicle 30 is to be refueled, the first output compressor valve 11a and the first dispensing valve 22 may be in an open position so that hydrogen may flow through the nozzle 10 of the dispensing module 4a and into the hydrogen tank 20 of the hydrogen vehicle 30 connected thereto. The first dispensing valve 22 is configured for regulating flow of hydrogen to the nozzle 10, based on the pressure measured with the pressure detection means 32 located downstream to the first dispensing valve 22. Thus, when refueling a hydrogen tank 20, the first dispensing valve 22 may open gradually to allow hydrogen to flow through the nozzle 10, thereby ensuring that pressure downstream to the first dispensing valve 22 is increased gradually to avoid overheating. It should be mentioned, that if a further dispensing module 4b is part of the refueling station 1, this preferably also includes a dispensing valve denoted 24 e.g. on FIG. 1 which operates as described with reference to the first dispensing valve 22.

It should be noted, that even though the first dispensing valve 22 and the second dispensing valve 24 is illustrated in the dispensing modules 4a, 4b it is preferred that their location is in the station module 3 upstream the cooling system. This is because the regulation performed by the first dispensing valves 22, 24 may introduce heat to the hydrogen gas which is easier to compensate for, if the dispensing valves 22, 24 (also sometimes referred to as regulating valves) are locate in the flow line before the cooling system (not illustrated).

Further it should be noted that preferably a valve is located in the dispenser modules 22, 24 which are controllable by the controller 9 of the station module 3, via which the flow of hydrogen gas to the vehicle tank 20 can be terminated.

If the pressure in the hydrogen vehicle 30 is such that cascade refueling may be performed instead of direct refueling, the hydrogen is instead directed towards the first cascade line 12a by closing the inlet compressor valve 7a and the first output compressor valve 11a and instead opening the first cascade valve 13a so that cascade refueling is performed. According to this embodiment, a refueling is started with a cascade fill and ends with a direct fill via the compressor in this way a high-pressure storage can be avoided.

Note that in this document low-pressure or first pressure should be understood as a pressure within the range of 30 to 300 bar such as 200 bar. The medium-pressure or second pressure should be understood as a pressure within the range of 200 to 500, such as 450 bar.

When a pressure balance between the low-pressure storage tank 6a and hydrogen vehicle 30 is reached, the flow from the low-pressure storage valve to the hydrogen vehicle 30 is terminated by closing any of the valves 21, 13a, 22. At this point, the hydrogen vehicle 30 may be sufficiently refueled (depending on the size of the hydrogen tank 20) or refueling may continue by proceeding with refueling from the medium-pressure storage tank 6b (also in this document referred to as second hydrogen storage tank). Accordingly, the low-pressure storage valve 21 and first cascade valve 13a are maintained closed so that hydrogen flow through the low-pressure supply line 5a is terminated. Instead, medium-pressure storage valve 23 (also in this document referred to as second storage valve) and second cascade valve 13b is opened so that hydrogen flows through medium-pressure supply line 5b (also in this document referred to as second supply line) and first cascade line 12a to dispensing line 18a and finally to the storage tank of the hydrogen vehicle via the dispenser valve 22 regulating flow/pressure and thereby further refueling the storage tank 20. It should be mentioned, that during bank shift i.e. shift between hydrogen source during cascade filling, the dispenser valve may stay open.

If, or when, the pressure in the low-pressure storage tank 6a and/or the medium-pressure storage tank 6b is equal to a threshold difference between this and the pressure in the vehicle tank 20 there is no, or a reduced, flow due to pressure equalization. Then it may be necessary to use the compressor 19 to pressurize the hydrogen by leading the flow of hydrogen through the compressor via first inlet compressor valve 7a or second inlet compressor valve 7b to finalize the refueling.

In this embodiment, the refueling station 1 comprises one dispensing module. However, in another embodiment, the hydrogen refueling station 1 may comprise a further dispensing module 18b or a plurality of dispensing modules, such as two, three, five, ten or more.

Also, in this embodiment, the bypass valve 16 is a backpressure valve. However, in another embodiment, the bypass valve 16 could be a quarter turn valve, butterfly valve, gate valve or any other type of valve.

Furthermore, in this embodiment, the compressor 19 is a reciprocating compressor. However, in another embodiment, the compressor 19 could be an axial flow compressor, screw compressor, centrifugal compressor or any other type of compressor for compressing/pressurizing the hydrogen.

In this embodiment, the controller 9 is arranged so that it is in direct wired communication with one of the valves and/or the pressure detection means. However, in another embodiment, the controller may be wirelessly connected to one of the valves and/or the pressure detection means by means of WiFi, Bluetooth, SigFox, 3G or other type of wireless communication network The pressure detection means 14 is arranged to monitor the pressure in the compressor outlet line 8 (or in the backflow line 15) so that, if a pressure increase is detected at the high-pressure side of the compressor 19, the bypass valve 16 redirects the flow of hydrogen from the compressor outlet line 8 and back to the low-pressure supply line 5a or the medium-pressure supply line 5b (depending on the status of the valves 21,23,7a,7b) where the hydrogen may either be recirculated into the compressor 19 via the compressor inlet line 17 or conducted back into the storage tanks for pressure consolidation (i.e. if the pressure is low and needs to be increased) via the low-pressure supply line 5a and the medium-pressure supply line 5b. Thereby, the pressure in the storage tank may be increased so that cascade refueling may be performed to a higher pressure so that the shift form cascade refueling to direct refueling may be "delayed" i.e. the tanks may refuel the hydrogen vehicle to a higher pressure solely by use of cascade refueling before direct filling is used.

If the first output compressor valve 11a is closed so that flow to the dispensing line 18a is terminated, the pressure in the compressor outlet line 8 is quickly build up due to the relatively low volume in this line. And when the pressure in the outlet line 8 reaches a threshold pressure, the bypass valve is opened so that fluid flows through the backflow line as described above. Thus, the pressure in the compressor outlet line 8 may be kept at a constant/required pressure the value of which is determined by the threshold pressure and the compressor operating speed may not be changed/the compressor may continue operation. Accordingly, when cascade filling a hydrogen vehicle from a hydrogen tank until pressure balance is reached, it is possible to easily switch to direct filling via the compressor by closing the relevant cascade vales (13a-13d) for further refueling the hydrogen vehicle up to a higher pressure than the capacity of the hydrogen storage tanks 6 i.e. high-pressure storage can be avoided. And since it is possible to maintain a constant/required pressure in the compressor outlet line 8 and which is approximately the threshold pressure, it may not be necessary to throttle the compressor or turn it on/off. Instead, the cascade valve 13 or 13b (depending on from which hydrogen tank cascade refueling was performed from) is closed and one or both of the output compressor valve 11a or 11b (depending on which dispensing module is active) is opened so that the refueling may continue by direct filling.

It is often necessary to be able to refuel a plurality of hydrogen vehicles 30. Therefore, in this embodiment, the hydrogen refueling station 1 comprises a further dispensing module 4b so that it is possible to refuel two hydrogen vehicles 30 one after the other or simultaneously independent of pressure in the tanks of the vehicles 30. The disclosure is obviously not limited to two dispensing modules, but could comprise three, five, ten or more dispensing module. A refueling system comprising three, four or more dispensing modules, would typically require several hydrogen storage modules 2 (or one with sufficiently large low/medium pressure storage) and hydrogen station modules 3. Thus, the hydrogen refueling station 1 could for example comprise one hydrogen storage module 2 with a corresponding hydrogen station module 3 and e.g. two dispensing modules 4a,4b. The number of storage tanks 6 in the individual storage modules 2 could be one, three, five, ten or more depending on the size of the station. The specific number of each type of storage tank (low-pressure, medium-pressure and high-pressure) could also be any combination for each hydrogen storage module (e.g. two low-pressure, two medium-pressure and one high-pressure or no high-pressure tank at all).

Providing the hydrogen refueling station 1 with two dispensing modules enables simultaneous refueling of two hydrogen vehicles. The refueling may be done by cascade refueling exclusively, direct refueling or a combination of both so that one of the vehicles 30 is refilled by cascade refueling and the other by direct refueling. An example of how the open/close status of the valves in a situation where cascade refueling of one vehicle and direct refueling of another vehicle is performed could be:

Refueling of a first vehicle 30a via the first dispensing module 4a: The hydrogen vehicle tank pressure is usually sufficiently low so that refueling may start by cascade filling from the low-pressure tank 6a. Thus, low-pressure storage valve 21, first cascade valve 13a and dispensing valve 22 are open while first inlet compressor valve 7a, first output compressor valve 11a and third cascade valve 13c are closed so that hydrogen may flow through low-pressure supply line 5a, first cascade line 12a and dispensing line 18a, through the first dispensing nozzle 10a and into the storage tank 20 of the first hydrogen vehicle 30 in the first dispensing module 4a whereby cascade refueling of the hydrogen vehicle is achieved. Once pressure equalization (e.g. at 200 bar) between the low-pressure hydrogen tank 6a and the hydrogen tank 20 of the first hydrogen vehicle 30 has been reached, the first cascade valve 13a closes, and the second cascade valve 13b and medium-pressure storage valve 23 may open so that cascade refueling form the medium-pressure storage tank may be initiated. The medium-pressure storage tank may cascade refuel the hydrogen tank 20 up to around e.g. 500 bar, typically the mass flow is reduced the closer the pressure equalization between storage and vehicle tank is. Hence the cascade fill may terminate at a predetermined pressure difference or at a certain mass flow. When cascade refueling from the medium pressure storage tank, the predetermined pressure difference may be within a range of 5 to 70 bar and preferably 15 bar. Once this state or predetermined pressure difference is reached, it may be decoupled from the dispensing module 4a or it may continue refueling by direct refueling from the compressor. In such a situation, both cascade valves 13a and 13b are closed and instead one of the first compressor inlet valves 7a or 7b are opened. Thus, the direct filling may continue by providing hydrogen from either low or medium storage tanks. In principle, it does not matter if the direct filling is provided via the low-pressure or medium-pressure storage tank (and the compressor) since the compressor will pressurize the hydrogen up to a sufficient pressure in any case. However, if fast pressurization is desired, it may be advantageous to direct refuel by use of the medium-pressure storage tank 6b since the pressure difference may be smaller. Also, direct refilling from the medium pressure storage tank 6b instead of low-pressure storage tank 6a may be beneficial if another hydrogen vehicle is queued for refueling at the first dispensing module 4a so that the waiting vehicle may commence refueling via the low-pressure storage tank 6a. However, hydrogen refueling stations usually comprise several low-pressure storage tanks 6a and medium pressure storage tanks 6b.

Refueling of a second vehicle 30b in the further dispensing module 4b: Medium-pressure storage valve 23, second inlet compressor valve 7b, the second output compressor valve 11b and the second dispensing nozzle 24 are open so that hydrogen may flow through medium-pressure supply line 5b, compressor inlet line 17, through compressor 19, through compressor outlet line 8, at least one further dispensing line 18b and into second hydrogen vehicle 30b via the second nozzle 10b whereby direct refueling is achieved. During direct fill from medium-pressure storage 6b, the first output compressor valve 11a, cascade valves 13a-13d, storage valve 21, inlet valve 7a are closed.

Above example is a very specific example of how cascade refueling, and direct filling may be performed simultaneously. However, it should be noted that the specific combination and arrangement of the valves may obviously be arranged differently for providing pure cascade- or direct refueling, or a combination of cascade/direct refueling.

The compressor may comprise several output lines so that the compressor may be used to direct fill to or from different pressures. For example, one output may be used to pressurize a hydrogen vehicle to a first pressure and the other output me be used to pressurize the hydrogen vehicle to a second pressure being higher than the first pressure so that the direct filling is performed in stages. The several output lines may also be used to increase the volume flow of hydrogen.

Figure 2:
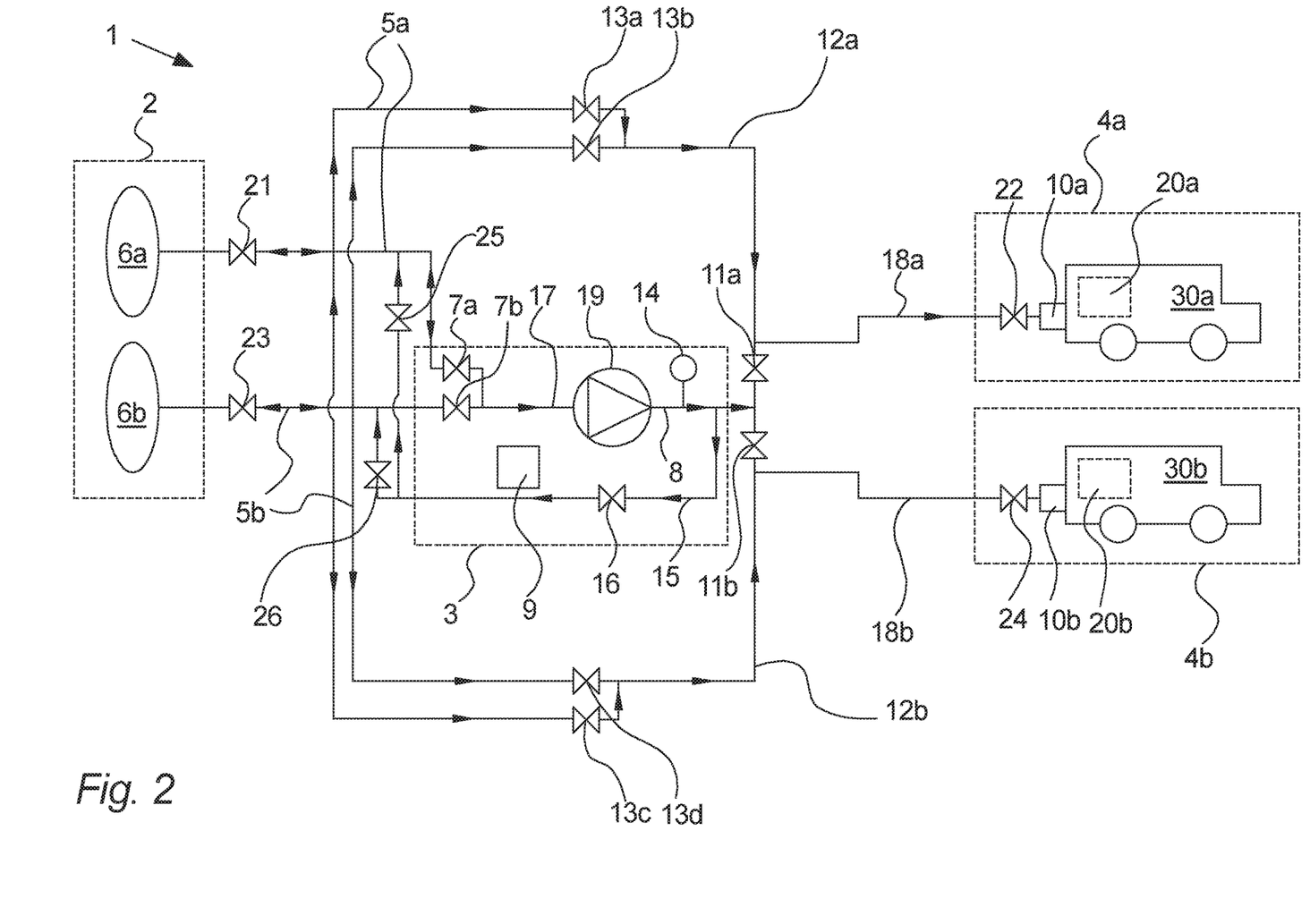
FIG. 2 illustrates a further embodiment of the hydrogen refueling station according to the disclosure.

In the embodiment disclosed in FIG. 1 the storage valves 21,23 and the compressor inlet valves 7a,7b control if the hydrogen from the backflow line 15 is to be fed into the storage tanks 6a,6b or back into the compressor. However, in another embodiment (as shown in FIG. 2), the refueling system may comprise backflow low-pressure/first pressure control valve 25 and backflow medium-pressure/second pressure control valve 26. Such valves may be any of the previously described type of valves.

It should be mentioned that the figures disclose several embodiments of the present disclosure but features of the figures are not limited to a particular embodiment. Hence, features of one figure can be used on an embodiment of another figure.

If the threshold pressure in the compressor outlet line 8 is reached, the pressurized hydrogen may be utilized for pressure consolidation of the hydrogen tanks, i.e. they may be refilled by the compressor. This may be performed by opening the bypass valve 16 so that hydrogen may flow through the backflow line 15 and back to the low-pressure or medium-pressure supply lines. In order to direct the flow of hydrogen to the storage tanks, one or both of the low-pressure storage valve 21 and medium-pressure storage valve 23 must be opened while the first inlet compressor valve 7a and second inlet compressor valve 7b are closed. Being able to perform pressure consolidation i.e. increasing pressure in one storage tank while decreasing pressure in a second storage tank is advantageous in that future refuelings can be made with high inlet pressure to the compressor and/or capacity of the compressor can be better utilized in that time of standstill of the compressor is reduced.

Figure 3:
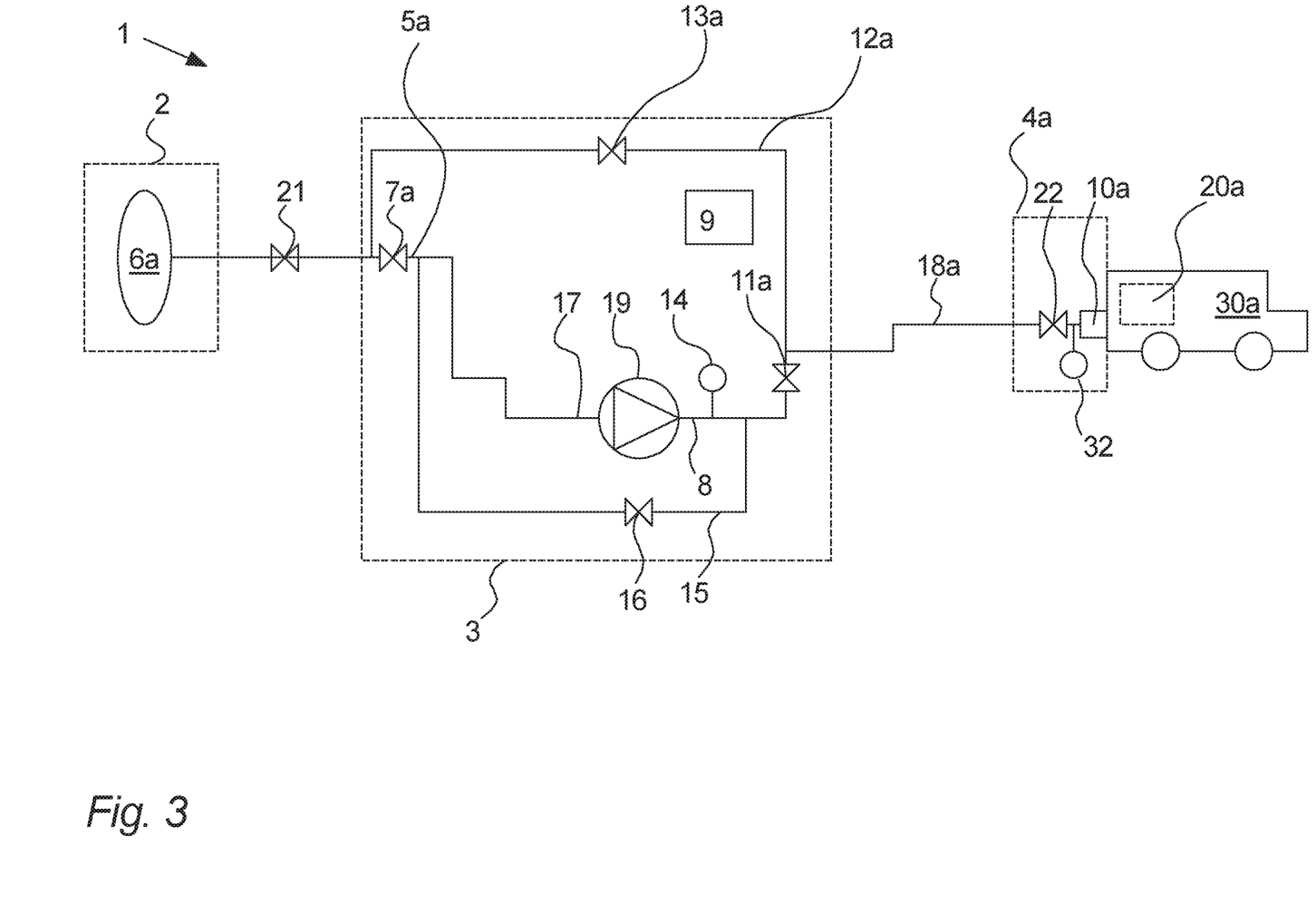
FIG. 3 illustrates a simplified embodiment of a hydrogen refueling station of the disclosure having one dispenser.

The present disclosure may also be implemented according to the illustration of FIG. 3 where a hydrogen refueling station 1 is illustrated. The hydrogen refueling station of FIG. 3 includes a storage module 2 comprising a first hydrogen storage tank connected to a first supply line 5a. The supply line is fluidly connected to compressor 19 of a hydrogen station module 3, through a compressor inlet line 17 comprising a first inlet compressor valve 7a, which by opening or closing controls the flow of hydrogen from the first hydrogen storage tank to the compressor. The compressor outlet is connected to a dispensing line 18a through a compressor outlet line 8 comprising a pressure detection means 14 positioned upstream to a first output compressor valve 11a. The output compressor valve 11a being configured to control the flow of hydrogen from the compressor outlet line 8 to the dispensing line 18a, by opening and/or closing. Further, the dispensing line fluidly connects the compressor outlet line 8 to a dispensing module 4a. The dispensing module comprises a dispensing valve 22, configured to regulate the flow of hydrogen supplied from the dispensing line 18a to a first dispensing nozzle 10a by opening and/or closing based on a pressure measured by a dispensing pressure detection means 32, which is configured to measure a pressure downstream of the dispensing valve 22. The first dispensing nozzle 10a is configured for fluidly connecting to a hydrogen tank with the purpose of refueling the hydrogen tank. The hydrogen tank may be a tank of a first hydrogen vehicle 30a. Furthermore, the hydrogen station module 3 comprises a first cascade line 12a, which fluidly connects the first supply line 5a with the dispensing line 18a by bypassing the compressor. The cascade line 12a comprises a first cascade valve 13a, which is configured to regulate, by opening and/or closing, the flow of hydrogen passing through the first cascade line 12a to the dispensing line 18a. In addition, the hydrogen station module 3 comprises a backflow line 15, which via a bypass valve 16, fluidly connects the compressor outlet line 8 to the compressor inlet line 17*a*. The backflow line thus runs from the portion of the compressor outlet line 8 that is positioned downstream to the pressure detection means 14 and upstream to the first output compressor valve 11*a*, and to the portion of the compressor inlet line 17 that is positioned upstream to the first inlet compressor valve 7*a*. The bypass valve 16 regulates the pressure in the backflow line 15 by opening and/or closing based on the pressure measured by the pressure detection means 14 and/or the dispensing pressure detection means 32. A controller 9 positioned in the hydrogen station module 3 is configured to control the flow in all the lines, and in the nozzle 10*a* by controlling the compressor and the degree of opening and/or closing of the valves, for example based on pressure measured with the pressure detection means 14 and dispensing pressure detection means 32. According to the embodiment of the disclosure illustrated in FIG. 3, a hydrogen tank 20 can be refueled using cascade refueling by bypassing the compressor 19, or by direct refueling via the compressor 19. Cascade refueling can be applied when the pressure in the hydrogen tank 20 is lower than the pressure in the first hydrogen storage tank 6*a*. When refueling a hydrogen tank, according to the embodiment of the disclosure illustrated in FIG. 3, the hydrogen tank 20 of the first vehicle 30*a* is connected to the first dispenser nozzle 10*a*, and a pressure is measured with the dispensing pressure detection means 32. If the measured pressure is substantially below the pressure in the first hydrogen storage tank 6*a*, the dispensing valve 22 and the first cascade valve 13*a* is opened, while the first output compressor valve 11*a* and the first inlet compressor valve 7*a* and is closed. Thereby, hydrogen is led from the first hydrogen storage tank 6*a* to the hydrogen tank 20, via the first supply line 5*a*, the first cascade line 12*a*, the dispensing line 18*a* and the dispensing nozzle 10. To avoid a damaging and dangerous pressure rise in the compressor outlet line 8, the controller 9 is configured to open the bypass valve 16 to lead hydrogen from the compressor outlet line 8 through the backflow line to the compressor inlet line, when the pressure measured with the pressure detection means 14 in the compressor outlet line reaches a threshold pressure. Alternatively, to a not illustrated vent line.

Additionally, this ensure that the compressor can be kept running to ensure the pressure in the compressor outlet line 8 is sufficiently high to enable fast refueling of a hydrogen tank when needed. In this way, without a high-pressure storage the refueling station 1 is always ready to start refueling of a second vehicle 30*b* because the compressor ensures a sufficiently high pressure at the output line 8. Thereby facilitating simultaneous refueling of two vehicles having different pressures in their vehicle tanks.

The backflow line 15 is furthermore advantageous in that if flow to a vehicle is terminated e.g. due to intermediate leak check the bypass valve 16 can be used to perform a controlled return of the gas flow either recycling to compressor inlet or to consolidate pressure in storage tanks 6. In this way, the bypass valve 16 functions as an escape for gas pressurized by the compressor and thereby the energy used on this pressurizing is not wasted. Furthermore, the operation of the compressor can continue which reduces wear of the compressor in that it does not have to be turned off and on again shortly after. Furthermore, the control of the pressure at the output line 8 performed by the bypass valve 16 ensures that no hydrogen gas needs to be vented and thereby the operation of the refueling station becomes more efficient.

The level of pressure at the output line 8 may be predetermined to a level that ensures that top off of a vehicle tank can be made or at any other level such as a suitable pressure for a first stage of a cascade fill, second stage of a cascade fill.

The pressure level may also be determined by pressure sensors 32, 33 and thereby indirectly by the pressure of gas in the vehicle tanks 20. Coordinated control of the compressor 19 and bypass valve 16 may facilitate an increase of pressure in the outlet line 8 thereby establishing the average pressure ramp rate suitable for the vehicle tank that is to be filled by the direct refueling method.

Finally, the pressure level may be determined by pressor sensors (not illustrated) of the storage 2 so that during times of no refueling or only cascade refueling, the compressor may be used to perform pressure consolidation of individual tanks 6 of the storage 2.

During cascade refueling of a hydrogen tank 20, when the pressure difference between the hydrogen tank 20 and the pressure in the first/second hydrogen storage tank 6*a*, 6*b* reaches a predetermined pressure difference measured using for example the dispensing pressure detecting means 32, 33, the controller 9 is configured to open the first output compressor valve 11*a* and/or the second output compressor valve 11*b* and the first compressor inlet valve 7*a* and/or the second compressor inlet valve 7*b*, while closing the bypass valve 16, and the first 13*a* and/or second 13*b* and/or third 13*c* and/or fourth 13*d* cascade valves. This enables direct refueling of the hydrogen tank 20*a* and/or 20*b* via the compressor outlet line 8.

During cascade refueling of a first hydrogen tank 20*a* or a second hydrogen tank 20*b*, typically the mass flow is reduced the smaller the pressure difference between the first or second hydrogen tank 20*a* or 20*b* and the first 6*a* or second 6*b* storage tank becomes. The cascade fill from a first hydrogen storage tank 6*a*, for example configured as a low-pressure storage tank, may thus terminate at a predetermined pressure difference within the range of 1 to 70 bar and possibly preferably at 30 bar. When reaching this predetermined pressure difference, refueling of the first hydrogen tank 20*a* may continue using cascade refueling from a second hydrogen storage tank 6*b*, for example configured as a medium-pressure storage tank, or direct refueling using the compressor. The cascade fill from the second hydrogen storage tank 6*b*, for example configured as a medium-pressure storage tank, may thus terminate at a predetermined pressure difference within the range of 1 to 70 bar and possibly preferably at 15 bar. When reaching this predetermined pressure difference, refueling of the first or second hydrogen tank 20*a*, 20*b* may continue with direct refueling using the compressor 19.

The controller 9 according to the embodiment of the disclosure illustrated in FIG. 3 is configured to keep the pressure in the compressor outlet line 8 as measured with the pressure detection means 14 above the pressure measured with the dispensing pressure detection means 32, while at the same time ensuring that the pressure in the compressor outlet line 8 does not exceed the threshold pressure of e.g. 750, 800, 850, 900 or 950 bar or 1050. When the pressure in the compressor outlet line reaches the threshold pressure, the bypass valve 16 is opened/regulates the flow in the backflow line to maintain the required/desired pressure at the outlet line 8. Then, during cascade refueling, the first compressor inlet valve 7*a* can be closed, while if no hydrogen tank is being refueled, the first compressor inlet valve 7*a* can be opened to lead hydrogen back to the first storage tank 6*a* for pressure consolidation hereof. The procedure of opening the bypass valve 16 to lead hydrogen back through the backflow line 15 to the low-pressure side of the compressor to keep the pressure below the threshold pressure, is further advantageous during for example a leakage check. During a leakage check, the first output compressor valve 11a is closed, and pressure is rapidly building up in the compressor outlet line. This would result in a necessary safety venting, where valuable hydrogen would be lost to the exterior if the system had no backflow line 15 and no bypass valve 16.

The first hydrogen storage tank 6a illustrated in FIG. 3 can be a low-pressure storage tank, but it may also be a medium or a high-pressure storage tank, and it may further comprise more than one hydrogen storage tank.

Figure 4:
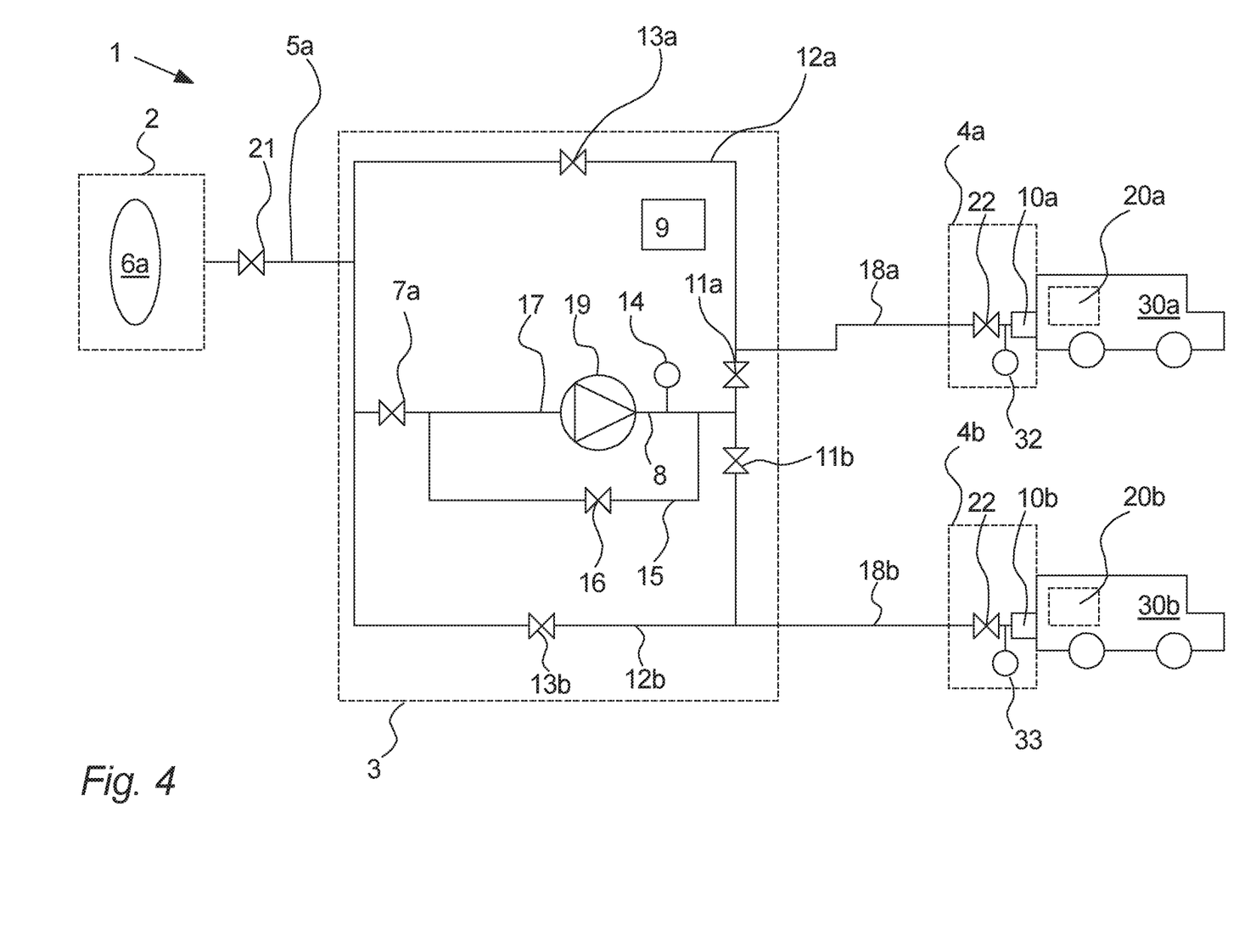
FIG. 4 illustrates an embodiment of the disclosure where the hydrogen refueling station is having two dispensers, and, FIG. 5. Illustrates an embodiment of the disclosure where the hydrogen storage module comprising different pressure tanks.

FIG. 4 illustrates an embodiment of the disclosure following the above described principles and having the above described advantages. In this embodiment, only on pressure level is available in the storage module 2. This pressure level may be a low-pressure of e.g. 250 bar which can be used as first stage cascade fill and supply to the inlet of the compressor. Having only one pressure level in the storage 2 requires a high capacity compressor to be able to deliver pressure enough to two direct refuelings. Having such high capacity compressor, which is able to establish a required pressure at the outlet line 8, facilitates simultaneous refueling of two vehicle tanks 20 having different pressure as long as the required pressure is above target pressure of the refueling i.e. the pressure at which the refueling terminates preferably when the state of charge of the vehicle tank is 100%. Hence by the dispensing valves 22, 33, controlled based on the pressure sensors 32, 33, the required pressure may be reduced to a first average pressure ramp rate suitable for refueling the first vehicle 30a via the first dispenser 4a and a second average pressure ramp rate suitable for refueling the second vehicle 30b via the further dispenser 4b.

Further, at mentioned if flow is terminated, the bypass valve can be used to maintain the required pressure by guide a controlled part of the flow of hydrogen in the outlet line 8 back to the storage 2 or inlet of the compressor.

Figure 5:
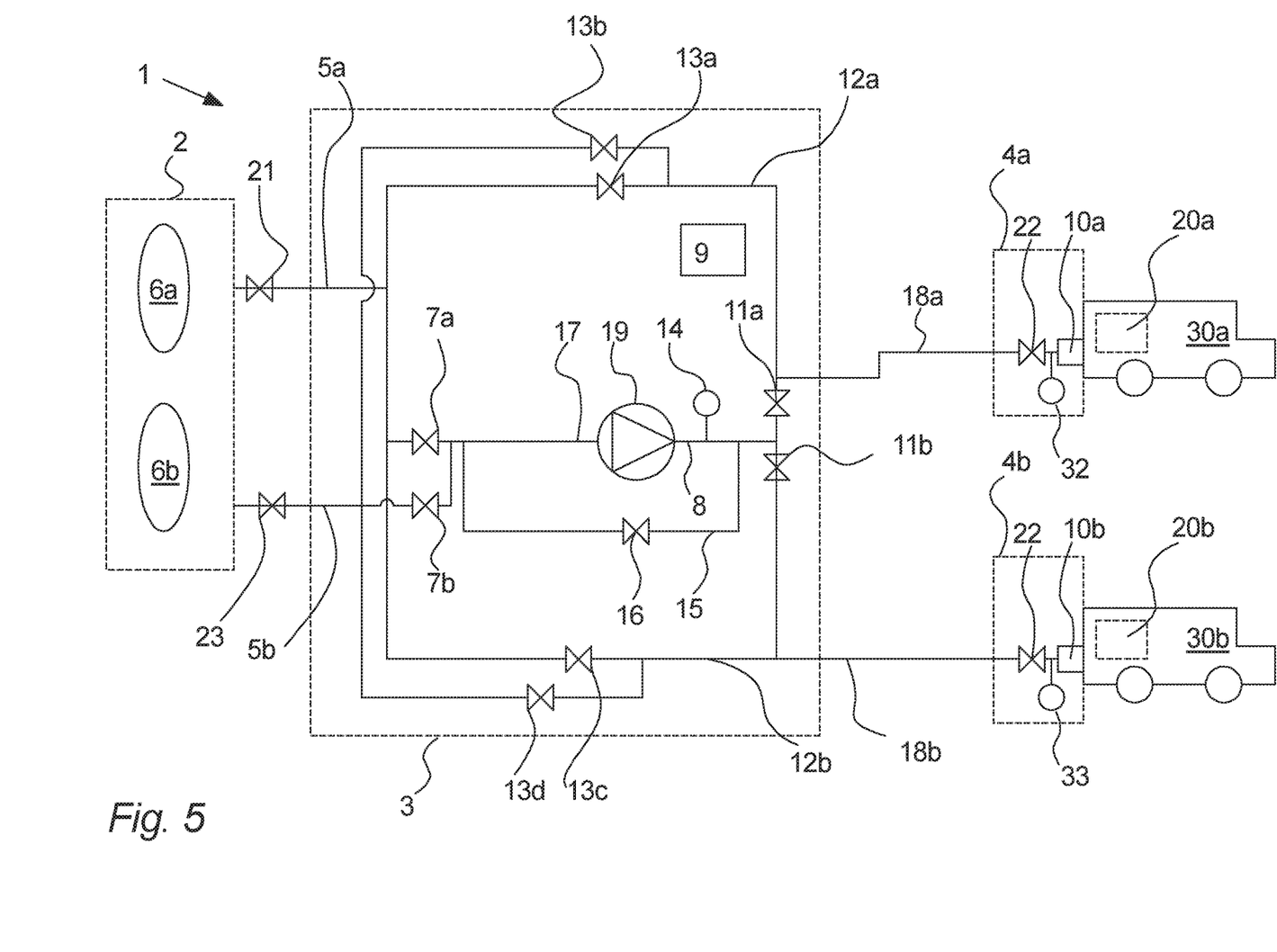

FIG. 5 illustrates a further embodiment of the disclosure following the above described principles and having the above described advantages. In this embodiment two pressure levels are available in the storage module 2. These pressure levels may e.g. be 200-250 bar in the first pressure storage 6a and 500-600 bar in the second pressure storage 6b. Having two pressure levels adds flexibility to the refueling station in that the vehicle can be refueled according to two stage cascade and direct which may lead to a faster refueling and reduced requirements to the compressor capacity.

To summarize, the disclosure relates to a hydrogen refueling station comprising a low-pressure storage tank and/or a medium-pressure storage tank (or a plurality of each of them, depending on the size of the station).

The low-pressure storage tank is connected to a cascade line via low-pressure supply line and a low-pressure storage valve which controls the flow of hydrogen from the low-pressure storage tank and out to the low-pressure supply line. The low-pressure supply line connects the low-pressure storage tank to a cascade line via a first cascade valve and to a compressor inlet line via a first compressor inlet valve.

The low-pressure storage tank is connected to a cascade line via low-pressure supply line and a low-pressure storage valve which controls the flow of hydrogen from the low-pressure storage tank and out to the low-pressure supply line. The low-pressure supply line connects the low-pressure storage tank to a cascade line via a first cascade valve and to a compressor inlet line via a first compressor inlet valve. An outlet compressor line is connected to a first output compressor valve so that a pressurized may be created in the compressor output line extending between the compressor outlet and the first compressor outlet valve. The cascade line and the compressor outlet line join to form a dispensing line for refueling a hydrogen vehicle via the dispensing line.

The medium-pressure storage tank is connected to a cascade line via medium-pressure supply line and a medium-pressure storage valve which controls the flow of hydrogen from the medium-pressure storage tank and out to the medium-pressure supply line. The low-pressure supply line connects the medium-pressure storage tank to a cascade line via a first cascade valve and to a compressor inlet line via a second compressor inlet valve. The cascade line and the compressor outlet line join to form a further dispensing line for refueling a hydrogen vehicle via the further dispensing line.

When the pressure in the compressor outlet line reaches a certain value referred to as threshold pressure either predetermined, determined by desired target pressure of a refueling or actual pressure level in vehicle tanks to be refueled, where the risk of component damage, explosion or other hazards exists if not action is taken, a backflow line is activated by a bypass valve so that the excess pressure may be vented through this backflow line. And instead of venting the excess pressure to the atmosphere, the hydrogen may recirculate into the inlet side of the compressor so that it enters the compressor again and thereby recirculates until the first and/or second output compressor valves and dispensing valves are open so that hydrogen may be dispensed. Also, the recirculated hydrogen may flow back to the hydrogen storage tanks so that these are re-pressurized (also referred to as pressure consolidation). Thereby, a high-pressure storage tank of maybe 1.000 bar is redundant, since the compressor is controlled to maintain a such a high-pressure hydrogen in the output line. The size of this pressure is determined and adjusted by the bypass valve. This is advantageous in that the situations where the compressor needs to be stopped (when all storage tanks are fully pressurized and no refueling is taking place) are reduced. Also, the compressor may run at a constant or variable operating speed since any critical pressure in the compressor outlet line may be led through the backflow line instead so that the turning the compressor on/off or throttling is not necessary or at least reduced. It is preferred to operate the compressor at a reduced operating speed over stopping the compressor.

Accordingly, the present disclosure facilitates simultaneous refueling of two vehicles having different pressure without a high-pressure storage.

The invention claimed is:
1. A hydrogen refueling station comprising:
   a hydrogen storage module comprising at least a first hydrogen storage tank
   a hydrogen station module comprising a compressor and a controller,
   a first dispensing module comprising a first dispensing nozzle connectable to a first vehicle and a first dispensing pressure detection means, and
   a second dispensing module comprising a second dispensing nozzle connectable to a second vehicle and a second dispensing pressure detection means,
   wherein a first supply line is fluidly connecting the hydrogen storage module to an inlet compressor line on a low-pressure side of the compressor via a first inlet compressor valve, wherein a compressor outlet line is fluidly connecting an outlet on a high-pressure side of the compressor to a dispensing line and thereby to the first dispensing module via a first output compressor valve and to a further dispensing line and thereby to the second dispensing module via a second output compressor valve, wherein a first cascade line is fluidly connecting the hydrogen storage module and the first dispenser module via a first cascade valve and thereby the first cascade line is configured for bypassing the compressor, wherein a second cascade line is fluidly connecting the hydrogen storage module and the second dispenser module via a third cascade valve and thereby the second cascade line is configured for bypassing the compressor, wherein the controller is configured for controlling valves (7a, 13a, 13b, 11a, 11b) and thereby a fluid path from the hydrogen storage module to the first dispensing module and to the second dispensing module, wherein a pressure detection means is configured for detecting a pressure in the compressor outlet line, wherein a backflow line is connecting the compressor outlet line to the first supply line via a bypass valve, wherein the controller is configured for controlling the bypass valve based on feedback from the pressure detection means, from the first dispensing pressure detection means or from the second dispensing pressure detection means to establish a required pressure in the compressor outlet line.

2. A hydrogen refueling station according to claim 1, wherein the hydrogen storage module further comprises at least one second hydrogen storage tank.

3. A hydrogen refueling station according to claim 2, wherein a second supply line is fluidly connecting the at least one second hydrogen storage tank to the inlet compressor line via a second inlet compressor valve, and
   the second supply line together with the first cascade line are fluidly connecting the at least one second storage tank to the dispensing line and thereby to the dispenser module via a second cascade valve, and
   the second supply line together with the second cascade line are fluidly connecting the at least one second storage tank to the further dispensing line and thereby to the further dispenser module via a fourth cascade valve.

4. A hydrogen refueling station according to claim 3, wherein the controller further is configured to control the status of at least one of the second inlet compressor valve, first output compressor valve, a first dispensing valve and second cascade valve based on the pressure in the second storage tank and/or pressure in a vehicle tank connected to the dispensing module.

5. A hydrogen refueling station according to claim 3, wherein the controller further controls the status of at least one of the second inlet compressor valve, second output compressor valve, a second dispensing valve and fourth cascade valve based on the pressure in the second storage tank and/or pressure in a vehicle tank connected to the further dispensing module.

6. A hydrogen refueling station according to claim 1, wherein at least a portion of the dispensing line and/or the further dispensing line is disposed under the supporting ground.

7. A hydrogen refueling station according to claim 1, wherein the controller is configured to control the status of at least one of the first inlet compressor valve, first output compressor valve, a first dispensing valve and first cascade valve based on the pressure in the first storage tank and/or pressure in a vehicle tank connected to the dispensing module.

8. A hydrogen refueling station according to claim 1, wherein the controller is configured to control the status of at least one of the first inlet compressor valve, second output compressor valve, a second dispensing valve and third cascade valve based on the pressure in the first storage tank and/or pressure in a vehicle tank connected to the further dispensing module.

9. A hydrogen refueling station according to claim 1 wherein the hydrogen refueling station comprises at least one further hydrogen station module.

10. A hydrogen refueling station according to claim 1, wherein the pressure detection means is arranged in the compressor outlet line.

11. A hydrogen refueling station according to claim 1, wherein the bypass valve is configured to open if the pressure in the compressor outlet line is above a threshold pressure selected in the range of 400 to 1200 bar.

12. A hydrogen refueling station according to claim 1, wherein the bypass valve is a backpressure valve.

13. A hydrogen refueling station according to claim 1, wherein the pressure detection means is arranged in the bypass valve.

14. A hydrogen refueling station according to claim 1, wherein the hydrogen is in gas form.

15. A hydrogen refueling station according to claim 1, wherein the hydrogen storage module is mobile.

16. A hydrogen refueling station according to claim 1, wherein at least one of the first storage tank and/or the second storage tank is mobile.

17. A hydrogen refueling station according to claim 1, wherein the required pressure is higher than the pressure measured by the first and second dispensing pressure detection means and/or is higher than the target pressure of the first and second vehicle.

18. A hydrogen refueling station according to claim 1, wherein the controller is configured to control the valves so as to facilitate simultaneous refueling tanks of two vehicles comprising hydrogen gas of different pressures.

19. A hydrogen refueling station according to claim 1, wherein the first dispensing valve and the second dispensing valve is located upstream in the flow lines from the hydrogen storage module to the dispensing modules of a cooling system of the hydrogen station module.

20. A method for refueling a hydrogen vehicle, the method comprising the steps of:
    allowing flow of hydrogen gas from a first hydrogen storage tank to a vehicle tank connected to a dispensing module via a first supply line, a first cascade line and a first dispensing line
    terminating the flow of hydrogen gas from the first hydrogen storage tank,
    allowing flow of hydrogen gas from a second hydrogen storage tank to the vehicle tank via a second supply line, the first cascade line and the first dispensing line,
    terminating the flow of hydrogen gas from the second hydrogen storage tank,
    establishing a flow of hydrogen gas from the first storage tank or the second storage tank via a compressor to the vehicle tank via the first supply line or second supply line, compressor inlet line, compressor outlet line and the first dispensing line,
    monitoring the pressure in the compressor outlet line with a pressure detection means, and controlling by a controller a bypass valve based on feedback from the pressure detection means to establish a required pressure in the compressor outlet line.

21. A method according to claim 20, wherein the method further comprising the step of while continuing refueling the vehicle connected to the dispensing module,
connecting a vehicle to a further dispensing module,
establish flow of hydrogen gas from the hydrogen storage module to the further dispensing module, and simultaneously refueling a vehicle from both dispensing modules.

22. A method according to claim 20, wherein the flow from the hydrogen storage module to the dispensing module and/or to the further dispensing module is controlled by the controller controlling one or more of a first storage valve, a second storage valve, a first inlet compressor valve, a second inlet compressor valve, a first output compressor valve, a second output compressor valve, a first cascade valve, a second cascade valve, a third cascade valve, a fourth cascade valve, a bypass valve, a first dispensing valve and a second dispensing valve.

23. A method according to claim 20, wherein hydrogen gas flow may be redirected via a back flow line to the first hydrogen storage tank or the second hydrogen storage tank via the first supply line or the second supply line.

24. A method according to claim 23, wherein the redirected hydrogen flow is recirculated back into the compressor.

25. A method according to claim 20, wherein the flow of hydrogen gas to one of the dispensing modules is terminated and redirected via a backflow line to the hydrogen storage module.

26. A method according to claim 20, wherein the controller controls the valves based on input from the vehicle tank, the pressure in the first hydrogen storage tank, the pressure in the second hydrogen storage tank, pressure reading from first dispensing pressure detection means and/or second dispensing pressure detection means.

27. A method according to claim 20 implemented in a hydrogen refueling station comprising:
a hydrogen storage module comprising at least a first hydrogen storage tank
a hydrogen station module comprising a compressor and a controller,
a first dispensing module comprising a first dispensing nozzle connectable to a first vehicle and a first dispensing pressure detection means, and
a second dispensing module comprising a second dispensing nozzle connectable to a second vehicle and a second dispensing pressure detection means,
wherein a first supply line is fluidly connecting the hydrogen storage module to an inlet compressor line on a low-pressure side of the compressor via a first inlet compressor valve,
wherein a compressor outlet line is fluidly connecting an outlet on a high-pressure side of the compressor to a dispensing line and thereby to the first dispensing module via a first output compressor valve and to a further dispensing line and thereby to the second dispensing module via a second output compressor valve,
wherein a first cascade line is fluidly connecting the hydrogen storage module and the first dispenser module via a first cascade valve and thereby the first cascade line is configured for bypassing the compressor,
wherein a second cascade line is fluidly connecting the hydrogen storage module and the second dispenser module via a third cascade valve and thereby the second cascade line is configured for bypassing the compressor,
wherein the controller is configured for controlling valves ($7a$, $13a$, $13b$, $11a$, $11b$) and thereby a fluid path from the hydrogen storage module to the first dispensing module and to the second dispensing module,
wherein a pressure detection means is configured for detecting a pressure in the compressor outlet line,
wherein a backflow line is connecting the compressor outlet line to the first supply line via a bypass valve,
wherein the controller is configured for controlling the bypass valve based on feedback from the pressure detection means, from the first dispensing pressure detection means or from the second dispensing pressure detection means to establish a required pressure in the compressor outlet line.

* * * * *